J. W. RUMSEY.

CAR DOOR.

APPLICATION FILED FEB. 12, 1913.

Reissued Oct. 12, 1915. 13,992.

Witnesses

Chas. L. Griesbauer.

A. R. Bridges

Inventor

James W. Rumsey

By Davis & Davis

Attorneys

UNITED STATES PATENT OFFICE.

JAMES W. RUMSEY, OF CHICAGO, ILLINOIS, ASSIGNOR OF ONE-HALF TO OSCAR HOGIN, OF CALIFA, CALIFORNIA.

CAR-DOOR.

13,992. Specification of Reissued Letters Patent. Reissued Oct. 12, 1915.

Original application filed November 17, 1910, Serial No. 592,917. Divided and application filed February 2, 1911, Serial No. 606,274. Original No. 1,027,156, dated May 21, 1912. Application for reissue filed February 12, 1913. Serial No. 747,935.

*To all whom it may concern:*

Be it known that I, JAMES W. RUMSEY, a citizen of the United States, and resident of Chicago, county of Cook, and State of Illinois, have invented certain new and useful Improvements in Car-Doors, of which the following is a specification, and which are illustrated in the accompanying drawings, forming a part thereof.

The invention relates to car doors, and has been divided out of my pending application for patent on car doors filed November 17th, 1910, Serial No. 592,917.

The invention relates more specifically to means for guidedly supporting and retaining the lower edge of a sliding car door; and the object of the invention is to provide a car door guide which shall engage the door for its entire width and which shall hold the door against the side of the car to prevent unauthorized persons from gaining entrance to the car by swinging the door outwardly from the car body.

The invention contemplates guiding means which may be used in place of the usual car door brackets, such brackets being then entirely dispensed with. While effective provision has been made for preventing the unauthorized removal of the car door brackets, nevertheless when such brackets are used access to the interior of the car without sliding the door is frequently obtained by breaking off that portion of the bracket which overlaps the door, whereupon the lower part of the door may be swung away from the car body a sufficient distance to permit a person to enter the door opening.

The invention further contemplates that the door shall be guidedly supported across its entire width, in order that it may not be sprung out of shape by pressure of freight against any part of the door from the inside.

Figure 1:
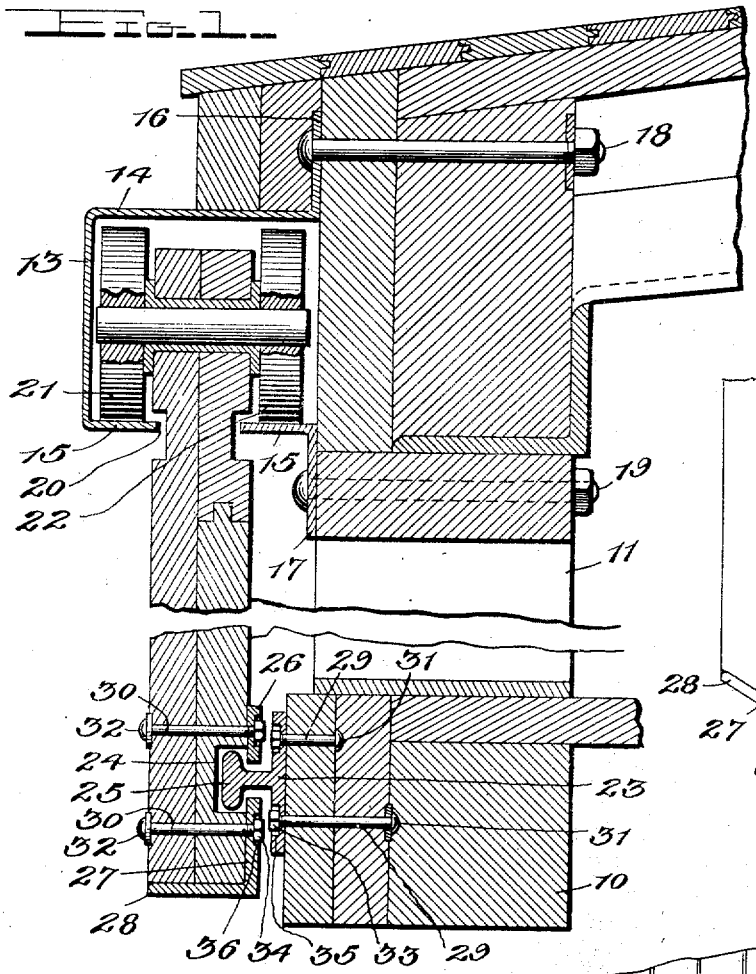
Figure 2:
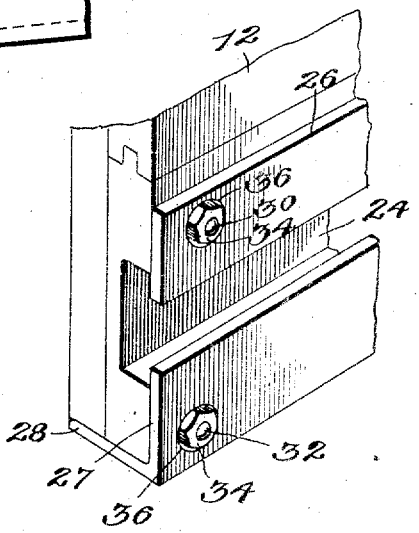
Figure 3:
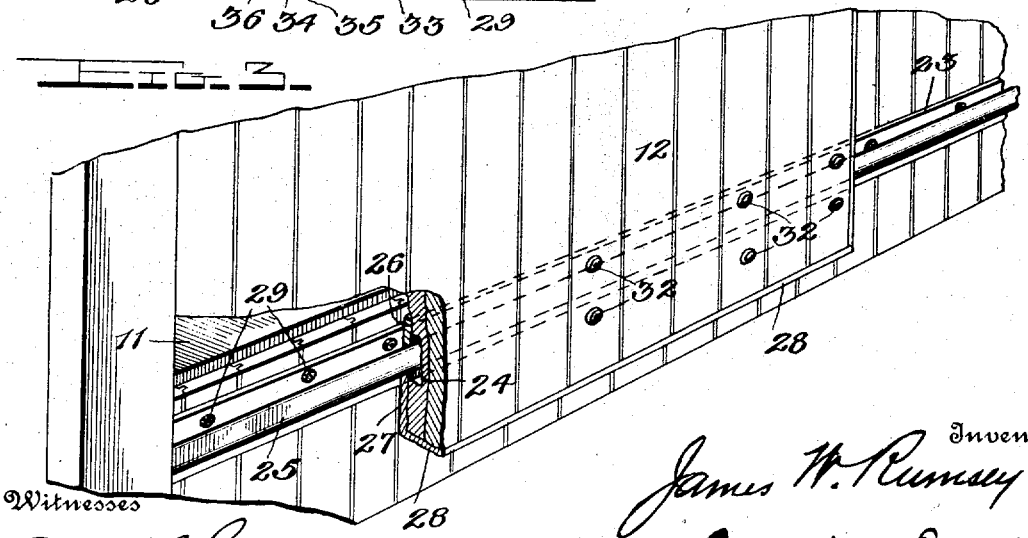

In the accompanying drawings Figure 1 is a detail transverse sectional view of a car body equipped with a door in the manner provided by the invention, the central portion of the door and car wall being broken away; Fig. 2 is a perspective view showing details of the inside face and one edge of the car door; and Fig. 3 is a detail perspective view of the side wall of the car and door, some of the parts being broken away to show the internal construction.

Details of the side wall of a car are shown at 10. The car has the usual side door opening 11, and the door 12 slides over the opening. The upper edge of the door may be slidingly supported in any convenient manner. As shown, a combined door track and hood 13 extends over the top of the door opening 11. This combined door track and hood comprises a channeled plate having upper and lower horizontal webs 14, 15, and vertical marginal flanges 16, 17. The vertical flanges 16, 17, are secured to the car body by bolts 18, 19. The lower horizontal web 15 of the combined track and hood is longitudinally slotted intermediate its ends, as indicated at 20, to receive the upper edge of the door 12, and rollers 21, 22, are secured to the door to roll on the upper face of the web 15 at each side of the slot 20.

In carrying out the invention a T-rail 23 is secured to the side wall of the car below the door opening 11. This T-rail preferably extends horizontally along the side wall of the car a sufficient distance to be engaged by the door throughout its entire width when the door is in either its open or closed position. The inside face of the door 12 is horizontally slotted, as indicated at 24, to receive the head 25 of the T-rail 23. To securely hold the door against the side of the car metal bars 26, 27, are secured to the inside face of the door above and below the slot 24. The edges of these bars overlie the slot and are preferably separated a less distance than the width of the T-head 25 of the rail 23. The bar 27 is preferably made in the form of an angle having a horizontal flange 28 which underlies the lower edge of the door for its entire width, thus serving as a binding or protection for the lower edge of the door when the latter is made of wood, as shown. The T-rail 23 is secured to the car by bolts 29 passed through the flanges of the T-rail and through the side wall 10 of the car. The bars 26, 27, are secured to the door 12 by bolts 30 which are passed through the bars and through the door. If now the bolts 29 are so disposed that their heads 31 come upon the inside of the side wall 10 of the car, and the bolts 30 are so disposed that their heads 32 come upon the outside of the car door 12, unauthorized removal of the bolts may be prevented by riveting over the ends 33, 34, of the bolts upon the nuts, as 35, 36, applied thereto. Preferably the nuts 35 and 36 are countersunk in the flanges of the T-rail 23 and in the bars 26, 27, respectively, to provide for a close fit of the door against the side wall of the car. By the use of the T-rail 23 and bars 26, 27, a sliding bearing for the lower edge of the door is provided across its entire width, and distortion of the door as by pressure of freight upon its inside face is effectually prevented. When the door 12 is made of wood, as shown, the slot 24 is formed by gaining out the inside face of the door.

It will be observed that when the door is open the rail 23, extending as it does along under the door opening across its entire width, is in position to act as a bumper rail in that it will take the shocks incident to the backing up of trucks and other vehicles against the car, this rail being of just the height to receive the thrust of the wheels or the body of the vehicle, this thrust or shock being exceedingly severe at times owing to the weight of the vehicle and the heavy loads they frequently bring to the car to be loaded therein. In this way I utilize this rail to protect the car body from these shocks due to the backing up of vehicles against the car. In order that these heavy shocks shall not crush or bend either the rail body or the upwardly extending flange on the head of the rail, it is important that this rail shall be so constructed as to have a broad bearing upon the car body both above and below the point where the thrust or blow is received on the rail, and it is also important that the upwardly extending flange on the head of the rail shall be sufficiently strong to prevent being bent inwardly by these shocks. I have found the best form of rail to be a solid T-rail having the usual bolt flanges above and below the web of the rail and a head having at least one flange extending upwardly the full length of the rail and being sufficiently thick to resist the shocks.

It will be observed further that a very essential feature of this invention lies in extending the head of the rail that is secured to the car body into the inner face of the door so that I may interlock with the upwardly extending flange on said head a guiding and thrust receiving plate fastened to the inner face of the door and depending behind said upwardly extending head flange. This is important for several reasons. In the first place it brings the interlocking members to a position where the door is rendered burglar proof in that it will be utterly impossible for an evil-disposed person to remove or bend or break either the rail on the car body or the interlocking depending plate on the door. In all other interlocking door guiding devices arranged at the bottom edge of the door that I am aware of, the interlocking flange or plate on the door is arranged below the rail on the car body and extends upwardly behind the same, so that as compared with my structure it would be an easy matter to pry off by means of a crow-bar or otherwise the flange or plate on the door and thus entirely free the lower edge of the door and permit it to be swung away from the car body sufficiently to gain access to its contents, and if this disconnection be made at the edge of the door remote from the sealing or locking devices this burglarizing of the car can be accomplished without disturbing the seal or the lock. This matter of burglarizing sealed cars is a very serious one, it being a common experience of all railways, these thefts being a daily occurrence.

Another new result of very great advantage with my construction is that the sagging of the roof structure of the car cannot disconnect the interlocking and sealing devices at the lower edge of the door since the sagging of the roof structure and the door hanging means will simply result in the door flange dropping down nearer to the web portion of the rail on the car body; and should this sagging continue to an extent that would bring the door flange to a point where it will contact with or rest upon the web of the rail, even this will not render the door inoperative as the flange will ride along the web of the rail, the flange and the rail being continuous. Should the sagging be unusually great, the door will be lifted relatively to the housing and the hanger rollers will make contact with the top wall of the housing and will thus prevent the door being locked against sliding movement until the sagging of the roof structure has gone on to an extent which would require that it be returned to the shops for bracing up or other repairs.

It will be observed further that should the contents of the car press against the door with any considerable force (which happens very frequently) the resultant bulging of the car door will bring the flange plate 26 against the upwardly extending flange on the rail head and thus form an abutment extending the full width of the door and should the cargo be in bulk, such as grain, the material will fall down into the opening between the car door and the car body and fill up said narrow passage and thus in effect calk this opening and prevent the egress of the cargo. And still another feature of great importance is that with my construction it is practically impossible for water to work into the door opening behind the lower part of the door since to do so it will have to take a circuitous path, leading into the horizontal recess or groove formed in the door body, then upwardly over the edge of the rail flange, thence outwardly under the door flange and thence upwardly to the door opening. I have subjected my construction to the severest water hose tests under high pressure and have found that it is absolutely water-tight. The idea of extending the rail head into the body of the door, that is, into a recess formed along the inner face of the door near its lower edge, is not only to provide an effectual water guard as stated, but also to bring the inner face of the door close to the car structure, thereby conducing greatly to strength and compactness and also bringing the door to a position where its inner face may be readily sealed against the car structure with but a slight bodily shifting of the door inwardly against the car.

I claim as my invention:—

1. In combination with a car body having a door opening in a vertical wall thereof, a door sliding over the opening in front of the plane of the said vertical wall of the car body, the door being larger than the opening and overlying the said vertical wall of the car below the opening, and continuous intercalating T-slot and T-rail members, one of such members extending horizontally across the inside face of the door for its entire width and the other of such members extending horizontally across the said vertical wall of the car below the door opening, the T-slot member being countersunk in the face of the part across which it extends.

2. In combination with a car body having a door opening in a vertical wall thereof, a continuous T-rail extending horizontally across the said vertical wall of the car body below the door opening, a door sliding over the opening in front of the plane of the said vertical wall of the car body, the door being larger than the opening and extending below the same for its entire width, the said extended part of the door being provided with a continuous horizontally disposed T-slot upon its inside face, said T-slot being extended across the entire width of the door and being engaged with the said T-rail, the throat of the T-slot being of less width than the head of the T-rail and embracing the web of the said T-rail behind the head, and means covered by the door for securing the T-rail to the said vertical wall of the car body.

3. In combination, a car body having a door opening in its side wall, a door, devices at the upper end of the door for slidingly supporting it on the car structure, and means at the lower edge of the door for slidingly confining it to the car structure, the lower edge of the door on its inner face being provided with a longitudinal recess at a point below the door opening, said means consisting of a plate or flange fastened to the inner face of the door and a rail fastened to the car body, the head of said rail projecting outwardly from the car body and into the recess in the door and engaging behind the flange or plate.

4. In combination, a car body having a door opening in its side wall, a door, devices at the upper end of the door for slidingly supporting it on the car structure, and means at the lower edge of the door for slidingly confining it to the car structure, the lower edge of the door on its inner face being provided with a longitudinal recess at a point below the door opening, said means consisting of a plate or flange fastened to the inner face of the door at a point above said recess and a rail fastened to the car body, the head of said rail projecting outwardly from the car body and into the recess in the door, said flange or plate depending to a point behind the head of the rail.

Signed this 27 day of January, 1913, at Chicago, Illinois.

JAMES W. RUMSEY.

In the presence of—
W. H. THROSBY,
FRANCIS H. QUAIL.